United States Patent [19]
Pantke et al.

[11] Patent Number: 6,050,601
[45] Date of Patent: Apr. 18, 2000

[54] AIRBAG SAFETY SYSTEM WITH INFLATION CONTROL

[75] Inventors: Siegfried Pantke, Peiting; Markus Schels, München, both of Germany; Damian Carter, Chongleton/Cheshire, United Kingdom

[73] Assignee: Autoliv Development AB, Vargarda, Sweden

[21] Appl. No.: 08/861,449

[22] Filed: May 22, 1997

[30] Foreign Application Priority Data

May 22, 1996 [DE] Germany .......................... 196 20 617

[51] Int. Cl.⁷ .................................................. B60R 21/26
[52] U.S. Cl. .......................... 280/742; 280/736; 280/738
[58] Field of Search ................................... 280/742, 736, 280/738

[56] References Cited

U.S. PATENT DOCUMENTS

| | | | |
|---|---|---|---|
| 4,006,919 | 2/1977 | Neuman | 280/742 |
| 5,707,078 | 1/1998 | Swanberg et al. | 280/742 |
| 5,820,162 | 10/1998 | Fink | 280/742 |

FOREIGN PATENT DOCUMENTS 4439123  5/1995  Germany .

Primary Examiner—Kenneth R. Rice
Attorney, Agent, or Firm—Robert W. Becker & Associates

[57] ABSTRACT

An airbag safety system has at least one airbag with inlets and a gas generator for generating a gas with which the at least one airbag is to be filled. An intermediate housing is connected between the gas generator and the at least one airbag. The gas is guided as a gas stream from the gas generator to the at least one airbag through the intermediate housing. The intermediate housing has outflow openings communicating with the inlets of the at least one airbag. A slide, positioned in the intermediate housing, is provided for controlling flow of the gas generated by the gas generator into the at least one airbag. The slide is displaceable relative to the inlets of the at least one airbag. An actuating member, mounted in the intermediate housing and positioned in the gas stream, is provided for generating a gas pressure force for displacing the slide. Controllably releasable securing elements for securing the slide at the intermediate housing in a rest position are provided. In the rest position, the cross-sectional area of the at least one outflow opening is unobstructed by the slide.

18 Claims, 1 Drawing Sheet

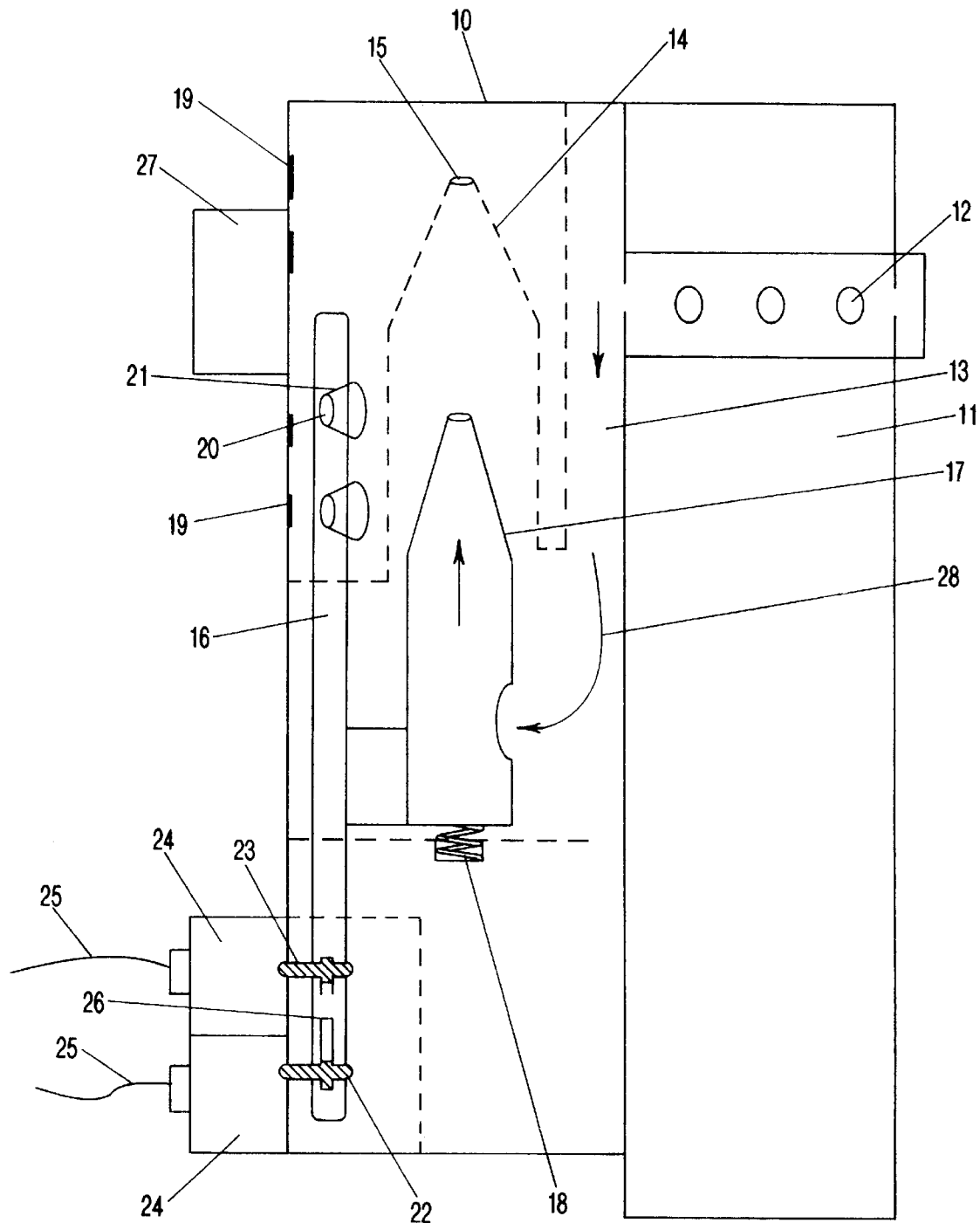

AIRBAG SAFETY SYSTEM WITH INFLATION CONTROL

BACKGROUND OF THE INVENTION

The invention relates to an airbag safety system, especially in motor vehicles, with a gas generator for generating a gas for inflating the airbag and with a slide as a valve member for controlling the inflation of the airbag, whereby the slide is arranged in an intermediate housing between the gas generator and the airbag.

An airbag arrangement of the aforementioned kind is known from German Patent Application 44 39 123. In order to be able to adjust the inflation of the airbag to changes of the ambient temperature in the vicinity of the gas generator, inlet openings that are provided within the intermediate housing that forms the connection to the airbag to be inflated, have coordinated therewith a slide as a valve member which is arranged displaceably within the intermediate housing. The position of the slide with respect to opening the inlet openings can be changed, for example, by a bimetal arrangement.

With respect to the general problem of airbag arrangements in regard to inflating an airbag or multiple airbags as a function of the detected accident data provided by a control device and especially adjusting the interior pressure of the airbag by a control means, the known airbag arrangement does not allow for such a control of the inflation process with respect to the inner pressure.

It is therefore an object of the present invention to provide an airbag safety system of the aforementioned kind with which the control of the inflation process can be performed as a function of the optionally detected accident data.

SUMMARY OF THE INVENTION

An airbag safety system according to the present invention is primarily characterized by:

At least one airbag having inlets;

A gas generator for generating a gas with which the at least one airbag is to be filled;

An intermediate housing connected between the gas generator and the at least one airbag, wherein the gas is guided as a gas stream from the gas generator to the at least one airbag through the intermediate housing;

The intermediate housing having outflow openings communicating with inlets of the at least one airbag;

A slide positioned in the intermediate housing, for controlling flow of the gas generated by the gas generator into the at least one airbag;

The slide displaceable relative to the inlets of the at least one airbag;

An actuating member, mounted in the intermediate housing and positioned in the gas stream, for generating a gas pressure force for displacing the slide;

Controllably releasable securing elements for securing the slide at the intermediate housing in a rest position in which a cross-sectional area of the at least one outflow opening is unobstructed by the slide.

The slide has through openings and, in the rest position, the through openings open (overlap) different cross-sectional areas of the outflow openings.

The securing element is a perforated plate connected to the slide.

The securing element is preferably a diffusor cone connected to the slide and guiding the gas stream from the gas generator to the outflow openings.

The intermediate housing comprises a receiving element matching the shape of the diffusor cone and providing a stop for movement of the diffusor cone.

The airbag safety system further comprises a spring supported at the intermediate housing and acting on the slide for biasing the diffusor cone toward the receiving element.

Advantageously, the slide comprises conically widened portions connected to the through openings at a side of the slide opposite the outflow openings and widening in a direction away from the through openings.

Advantageously, the securing elements are released by the at least one airbag when being filled with the gas.

The securing elements are ripcords acting as a rated break point. The ripcords are destroyed by the at least one airbag when being filled with the gas.

The airbag safety may further comprise a device for severing explosively the securing elements. The securing are preferably bolts.

The slide is secured by a plurality of securing elements arranged with a stepped spacing to one another at the intermediate housing. The slide can assume different positions relative to the outflow openings of the intermediate housing in a time sequence.

Two of the outflow openings communicate with one of the airbags and the two outflow openings are arranged such that in different laterally staggered positions of the slide a sequential multiple filling of the airbag to different degrees is possible.

The intermediate housing has an auxiliary outflow opening communicating with the surrounding atmosphere and the slide comprises an auxiliary opening for communicating with the auxiliary outflow opening.

A plurality of the airbags are connected to the intermediate housing and are supplied with gas via coordinated ones of the outflow openings and coordinated ones of the through openings in the slide.

At least two of the airbags communicate with one another for venting one of the airbags into another one of the airbags by selecting the outflow openings and the through openings appropriately.

The at least one airbag has multiple chambers that are connected to the intermediate housing via separate ones of the outflow openings controlled by the slide.

Preferably, the chambers are embodied as lateral airbag members of a vehicle seat, a thorax airbag member, and a head airbag member.

The airbag safety system may further comprise a gas reservoir, wherein the intermediate housing has a connecting opening for connecting the intermediate housing to the gas reservoir.

The basic principle of the invention is that the slide is displaceably arranged relative to the inlets of the airbag(s) and is connected to an actuating member for generating a gas pressure force for displacement of the slide, whereby the actuating member is positioned in a gas stream between the gas generator and the outflow openings of the intermediate housing. The slide, in its rest position in which the cross-sectional areas of the outflow openings are unobstructed, is secured at the intermediate housing by controllably releasable securing elements.

The invention has the advantage that via the controllably releasable connection between the slide and the intermediate housing it is achievable that the slide allows free passage of, partly limits or shuts off the gas stream via its through openings that are aligned, depending on the slide position, with corresponding outflow openings by cancelling the securing of the slide at a predetermined point in time. The slide thus changes its position relative to the intermediate housing and the outflow openings arranged thereat; this may also be used, for example, for a deflection of the gas stream coming from the gas generator. As will be explained in the following with preferred embodiments of the invention, the gas stream can be released into the atmosphere so that a predetermined interior pressure within the airbag preselected according to the accident data cannot be surpassed, or the gas stream can be guided into further airbags connected to the intermediate housing whereby different pressures within the individually connected airbags can be produced. Accordingly, the amount of time needed for filling the respective airbag, respectively, its inflation action can be influenced. A further advantage of the invention is that, due to the special embodiment of the slide, the required displacement force can be obtained from the pressure energy contained within the already present gas stream.

According to one particular embodiment of the invention, it is suggested that the slide with its through openings opens (overlaps) in its rest position different cross-sectional areas of the respective outflow openings of the intermediate housing.

With respect to the embodiment of the actuating member extending into the gas stream, it is suggested with the invention to embody the actuating member either as a perforated plate connected to the slide or a diffusor cone guiding the gas stream. Further embodiments of an actuating member producing a gas pressure force lie within the gist of the present invention.

According to one embodiment of the invention, it is suggested that the intermediate housing comprise a conical receiving unit matching the shape of the diffusor cone of the slide and serving as an end stop for the movement of the slide. Accordingly, in an advantageous manner the end position of the slide is fixed. In order to ensure even for fluctuations of the gas pressure a sufficient displacement of the slide, according to another embodiment of the invention it may be expedient to bias the slide and diffusor cone arrangement with a spring that is supported between the intermediate housing and the slide in the direction of the receiving unit of the intermediate housing.

According to one embodiment of the invention the slide comprises a funnel shaped widened portion at its through opening at a side thereof facing away from the outflow openings of the intermediate housing. This has the advantage that via the funnel-shaped widened portions a pressure for improved sealing between the slide and the outflow openings is provided at the intermediate housing.

The controllably releasable securing of the slide at the intermediate housing according to one embodiment of the invention is realized in that the securing means for securing the slide at the intermediate housing are controllably released by the airbag undergoing inflation. In an especially preferred embodiment it may be provided that the securing means is embodied as a rip cord to be destroyed by the airbag being inflated and providing a rated breakpoint.

Alternatively, a separate position for release of the slide is provided in that the fastening means in the form of a bolt which can be severed explosively by a corresponding control device-controlled severing device. In a special embodiment of the invention, the slide is provided with a plurality of securing means distributed at a stepped distance to one another to the intermediate housing so that the slide, in a time sequence, can assume different positions relative to the outflow openings of the intermediate housing. This allows for a multi-step control of the airbag safety system. It is possible to provide an airbag connected to the intermediate housing with two outflow openings such that in different positions of the slide different degrees of filling of the airbag are possible in a sequential manner with stepped timing. A corresponding control based on accident data is carried out via a processing unit.

The invention can be realized with various configurations of airbag arrangements. For example, according to one embodiment, it may be provided that the intermediate housing comprises, in addition to the outflow opening for connecting thereto an airbag, at least one auxiliary outlet opening to the atmosphere is provided. This auxiliary outflow opening has coordinated therewith an auxiliary through opening in the slide. In this embodiment, after reaching the desired inner pressure, the remainder of the gas generated by the gas generator is released into the atmosphere.

In the alternative, it may be provided that a plurality of airbags is connected to the intermediate housing via coordinated outflow openings and correspondingly arranged through openings within the slide. According to one embodiment of the invention, it may be provided that at least two airbags are connected to one another by correlating the outflow openings through which they are loaded to the through openings of the slide such that ventilation of the airbag to the other airbag is possible.

Instead of providing a plurality of separate airbags, according to one embodiment of the invention it may be provided that different chambers of one individual airbag are connected via separate outflow openings controlled by the slide to the intermediate housing. In a special embodiment of the invention, the different chambers are airbag components connected to the vehicle seat and providing a thorax-protecting airbag as well as a head-protecting airbag.

According to another embodiment of the invention one of the outflow openings (connecting opening) may have connected thereto a gas storage means (gas reservoir) for receiving and storing the gas still flowing after displacement of the slide in order to make it available for further airbag functions such as inflation of another airbag.

BRIEF DESCRIPTION OF THE DRAWING

The object and advantageous of the present invention will appear more clearly from the following specification in conjunction with the accompanying drawing, in which the only FIGURE shows an embodiment of an intermediate housing, with gas generator connected thereto and a slide arranged within, in a schematic representation.

DESCRIPTION OF PREFERRED EMBODIMENTS

The present invention will now be described in detail with the aid of specific embodiment utilizing the only FIGURE.

A gas generator 11 is mounted at an intermediate housing 10. The gas generator has outflow openings 12 via which the gas generated by the gas generator 11 is introduced into the intermediate housing 10 and guided in a channel 13 within the intermediate housing 10 in a direction toward the slide 16 displaceably arranged within the intermediate housing 10. The intermediate housing 10 comprises a receiving unit 14 of a truncated cone shape and an outlet 15 at the top of the truncated cone.

In the intermediate housing 10 a slide 16 is displaceably supported which, in its central area, comprises a diffusor cone 17 which is displaceable in the direction of the conical receiving unit 14. The slide 16 is biased in the direction toward the receiving unit 14 by a spring 18 supported at the intermediate housing 10. A respective wall at the exterior of the intermediate housing 10 has outflow openings 19. A non-represented airbag, respectively, two airbags as shown in the disclosed embodiment, are connected to the openings 19. The slide 16, which is displaceable along the wall of the intermediate housing 10 that has provided thereat the outflow openings 19, is provided with through openings 20 which, depending on the position of the slide 16, are aligned with the outflow openings 19 or staggered thereto such that the slide 16 partly or entirely covers these openings 19. In the shown embodiment the outflow opening 19 is aligned with the through opening 20 of the slide 16. A second outflow opening 19 that partly overlap the corresponding through opening 20 of the slide 16 is represented so that the airbag connected to this through opening 19 will be filled in this position of the slide 16 to a lesser degree. At the side of slide 16 facing away from the outflow openings 19, the through openings 20 are provided with funnel-shaped widened portions 21 so that the gas pressure caused by the gas flowing through them provides a sealing action between the slide 16 and the wall of the intermediate housing 10 respectively, the correlated outflow openings 19.

In the represented embodiment the slide 16 is connected to the housing wall of the intermediate housing 10 via two securing elements that are staggered in a stepwise manner relative to one another whereby the first securing element 22 secures the slide 16 at the housing wall. Above the slide 16, in the direction of movement, a second securing element 23 is provided. The slide 16 can be displaced relative to the securing element 23 within a slotted hole 26. The two securing elements 22, 23 have coordinated therewith ignition units 24 which are connected via lines 25 to a non-represented control unit.

In addition to the two outflow openings 19 for the two separate airbags, the intermediate housing 10 has a further outflow opening with a gas reservoir 27 connected thereto. Above, respectively, behind the outflow (connecting) opening 19 to the gas reservoir 27, when viewed in the direction of movement of the slide 16 relative to the intermediate housing 10, a further outflow opening 19 for connection to another airbag is provided.

After ignition of the gas generator 11, gas flows via the outlet openings 12 into the channel 13, as indicated by arrows 28. The gas enters the diffusor cone 17 of the slide 16 and flows through the receiving unit 14 and the flow opening 15 toward the through openings 20 in the slide 16 (arrows 28), where its flow cross-section is restricted so that a dynamic gas pressure results that generates a displacement force for the slide 16, and the aligned outflow openings 19 and into the two connected airbags. The slide 16, as disclosed above, is secured by the securing elements 22, 23 in its rest position.

When a pre-determined interior pressure has been reached within the airbags, the ignition unit 24 coordinated with the securing element 22 is ignited so that the securing element 22 will break and the slide 16 by the force acting on the diffusor cone 17, aided by the force of the spring 18, is displaced until the end of the slotted hole 26 contacts the further securing element 23. In this position, gas can enter the gas reservoir 17. After ignition of the further ignition unit 24 correlated with the securing element 23, the slide 16 is displaced into a position in which via the outflow opening 19, arranged in the direction of displacement behind the reservoir 27, filling of a further airbag connected thereto is possible.

The aforedescribed embodiment of the invention discloses in how many different ways the inventive slide control can be used in order to allow for a one or multiple fillings of the airbag, respectively, of a plurality of airbags with different pressures according to the recorded accident data. Furthermore, by opening an outflow opening 19 to the atmosphere at a later point in time by the slide 16 being moved accordingly, venting (emptying) of the airbag, for example, when the passenger impacts on the airbag, is possible.

The present invention is, of course, in no way restricted to the specific disclosure of the specifications, and drawings, but also encompasses any modifications within the scope of the appended claims.

What we claim is:

1. An airbag safety system comprising:

at least one air bag having inlets;

a gas generator for generating a gas with which said at least one airbag is to be filled;

an intermediate housing connected between said gas generator and said at least one airbag and having outflow openings communicating with said inlets of said at least one air bag:

wherein the gas is guided as a gas stream from said gas generator through said intermediate housing and said outflow openings into said at least one air bag;

a slide, positioned in said intermediate housing, for controlling flow of the gas generated by said gas generator into said outflow openings;

said slide displaceable relative to said outflow openings to thereby open and close different ones of said outflow openings depending on a position of said slide;

an actuating member, mounted in said intermediate housing such that the entire gas stream generated by said gas generator is guided through said actuating member before reaching said outflow openings to thereby generate a dynamic gas pressure acting as a displacement force on said slide;

controllably releasable securing elements for securing said slide at said intermediate housing in a rest position in which a cross-sectional area of at least one of said outflow openings is unobstructed by said slide.

2. An airbag safety system according to claim 1, wherein said slide has through openings and wherein, in said rest position, said through openings open different cross-sectional areas of said outflow openings.

3. An airbag safety system according to claim 1, wherein said actuating member is a perforated plate connected to said slide.

4. An airbag safety system according to claim 1, wherein said actuating member is a diffusor cone connected to said slide and guiding said gas stream from said gas generator to said outflow openings.

5. An airbag safety system according to claim 4, wherein said intermediate housing comprises a receiving element matching a shape of said diffusor cone and providing a stop for a movement of said diffusor cone.

6. An airbag safety system according to claim 5, further comprising a spring supported at said intermediate housing and acting on said slide for biasing said diffusor cone toward said receiving element.

7. An airbag safety system according to claim 2, wherein said slide comprises conically widened portions connected to said through openings at a side of said slide opposite said outflow openings and widening in a direction away from said through openings.

8. An airbag safety system according to claim 1, wherein said securing elements are released by said at least one airbag when being filled with the gas.

9. An airbag safety system according to claim 8, wherein said securing elements are rip cords acting as a rated break point and wherein said rip cords are destroyed by said at least one airbag when being filled with the gas.

10. An airbag safety system according to claim 1, further comprising a device for severing explosively said securing elements wherein said securing elements are bolts.

11. An airbag safety system according to claim 1, wherein said slide is secured by a plurality of said securing elements arranged with a stepped spacing to one another at said intermediate housing, wherein said slide can assume different positions relative to said outflow openings of said intermediate housing in a time sequence.

12. An airbag safety system according to claim 11, wherein two of said outflow openings communicate with one of said airbags and wherein said two outflow openings are arranged such that in different laterally staggered positions of said slide a sequential multiple filling of said airbag to different degrees is possible.

13. An airbag safety system according to claim 1, wherein said intermediate housing has an auxiliary outflow opening communicating with a surrounding atmosphere and wherein said slide comprises an auxiliary opening for communicating with said auxiliary outflow opening.

14. An airbag safety system according to claim 1, wherein a plurality of said airbags are connected to said intermediate housing and are supplied with the gas via coordinated ones of said outflow openings and coordinated ones of said through openings in said slide.

15. An airbag safety system according to claim 14, wherein at least two of said airbags communicate with one another for venting one of said airbags into another one of said airbags by selecting said outflow openings and said through openings appropriately.

16. An airbag safety system according to claim 1, wherein said at least one airbag has multiple chambers and wherein said multiple chambers are connected to said intermediate housing via separate ones of said outflow openings controlled by said slide.

17. An airbag safety system according to claim 16, wherein said chambers are embodied as lateral airbag members of a vehicle seat, a thorax airbag member, and a head airbag member.

18. An airbag safety system according to claim 1, further comprising a gas reservoir, wherein said intermediate housing has a connecting opening for connecting said intermediate housing to said gas reservoir.

* * * * *